(12) United States Patent
Shan et al.

(10) Patent No.: US 11,603,294 B2
(45) Date of Patent: Mar. 14, 2023

(54) METHOD AND SYSTEM FOR CONTROLLING OPERATION OF CRANE, AND CRANE

(71) Applicant: XUZHOU HEAVY MACHINERY CO., LTD., Xuzhou (CN)

(72) Inventors: Zenghai Shan, Xuzhou (CN); Changjian Zhu, Xuzhou (CN); Lijing Li, Xuzhou (CN); Junfei Chai, Xuzhou (CN); Lei Li, Xuzhou (CN)

(73) Assignee: Xuzhou Heavy Machinery Co., Ltd, Xuzhou (CN)

( * ) Notice: Subject to any disclaimer, the term of this patent is extended or adjusted under 35 U.S.C. 154(b) by 930 days.

(21) Appl. No.: 16/474,476

(22) PCT Filed: Dec. 27, 2016

(86) PCT No.: PCT/CN2016/112277
§ 371 (c)(1),
(2) Date: Jun. 27, 2019

(87) PCT Pub. No.: WO2018/119621
PCT Pub. Date: Jul. 5, 2018

(65) Prior Publication Data
US 2019/0345010 A1 Nov. 14, 2019

(51) Int. Cl.
*B66C 13/46* (2006.01)
*B66C 13/22* (2006.01)
(Continued)

(52) U.S. Cl.
CPC .............. *B66C 13/46* (2013.01); *B66C 13/22* (2013.01); *B66C 15/06* (2013.01); *G06T 17/00* (2013.01)

(58) Field of Classification Search
CPC .......... B66C 13/46; B66C 13/22; B66C 15/06; G06T 17/00
(Continued)

(56) References Cited

U.S. PATENT DOCUMENTS 6,985,085 B1 1/2006 Brown
2008/0309784 A1 12/2008 Asari et al.
(Continued)

FOREIGN PATENT DOCUMENTS

CN 202337649 U 7/2012
CN 103407883 A 11/2013
(Continued)

OTHER PUBLICATIONS

English Translation for CN105347211A (Year: 2022).*
(Continued)

*Primary Examiner* — Mahmoud S Ismail
(74) *Attorney, Agent, or Firm* — Merchant & Gould P.C.

(57) ABSTRACT

Provided are a method and a system for controlling operation of a crane, and a crane. The method includes: scanning dynamically, by a 3D imaging device, a plurality of objects within an operating range of the crane to obtain 3D spatial information of each of the plurality of objects, wherein the plurality of objects includes the crane and an obstacle, the 3D spatial information includes 3D spatial coordinates; determining a distance from the obstacle to a preset position of the crane based on the 3D spatial coordinates of the crane and the obstacle; judging whether the distance from the obstacle to the preset position is less than a preset distance corresponding to the preset position; and performing an alarm if the distance from the obstacle to the preset position is less than the preset distance corresponding to the preset position.

20 Claims, 5 Drawing Sheets

(51) Int. Cl.
*B66C 15/06* (2006.01)
*G06T 17/00* (2006.01)

(58) Field of Classification Search
USPC .......................................................... 701/50
See application file for complete search history.

(56) References Cited

U.S. PATENT DOCUMENTS

| | | | |
|---|---|---|---|
| 2013/0299440 A1 | 11/2013 | Hermann et al. | |
| 2015/0110582 A1* | 4/2015 | Jacobsen | B66C 13/06 414/803 |
| 2015/0161872 A1 | 6/2015 | Beaulieu et al. | |
| 2016/0031680 A1* | 2/2016 | Delplace | B66C 13/16 703/7 |
| 2016/0236913 A1* | 8/2016 | Ilaka | B66D 1/54 |
| 2017/0345320 A1* | 11/2017 | Aphek | G08G 5/045 |
| 2018/0370776 A1* | 12/2018 | Schoonmaker | B66C 23/88 |

FOREIGN PATENT DOCUMENTS

| | | |
|---|---|---|
| CN | 103613014 B | 1/2016 |
| CN | 105293283 A | 2/2016 |
| CN | 105347211 A * | 2/2016 |
| CN | 105347211 A | 2/2016 |
| EP | 2899496 A1 | 7/2015 |
| JP | 2007-015814 A | 1/2007 |

OTHER PUBLICATIONS

International Search Report and Written Opinion from International Application No. PCT/CN2016/112277, dated Sep. 28, 2017.
Search Report for European Patent Application No. 16925194.9 dated Jul. 24, 2020.
PCT Written Opinion in International Application PCT/CN2016/112277, dated Sep. 28, 2017, 7 pages.
PCT Preliminary Report on Patentability in International Application PCT/CN2016/112277, dated Jul. 11, 2019, 6 pages.
Third Party Observation in European Application 16925194.9, mailed Feb. 4, 2022, 3 pages.
Fang, Yihai, "Real-Time Safety Assistance to Improve Operator's Situation Awareness in Crane Lifting Operations", Dissertation, Georgia Institute of Technology, Dec. 2016, 133 pages, (a Non-patent literature filed by a third party in EP 16925194.9).
Response to 3rd Party Observation in European Application 16925194.9, filed Mar. 22, 2022, 3 pages.

* cited by examiner

METHOD AND SYSTEM FOR CONTROLLING OPERATION OF CRANE, AND CRANE

This application is a National Stage Application of International Application No. PCT/CN2016/112277, filed Dec. 27, 2016, the application of which is incorporated herein by reference. To the extent appropriate, a claim of priority is made to the above disclosed application.

TECHNICAL FIELD

The present disclosure relates to the technical field of engineering machinery, in particular to a method and a system for controlling operation of a crane, and a crane.

BACKGROUND

The operating environment of a crane in lifting operation is relatively complicated due to obstacles such as a high-voltage line, a tree, a wall, or the like surrounding the crane. Also, the shape of the lifted object such as a wind turbine blade or a tank is relatively variable. Therefore, both the crane and the lifted object may collide with an obstacle in the surrounding environment during a lifting operation. For example, the boom head of the crane may collide with a high-voltage line, and the lifted object may collide with a wall. Once the crane or the lifted object collides with an obstacle, damage to the crane or the lifted object will be caused, and a safety accident will even occur.

In the related art, a crane operator is mainly relied on to observe the surrounding environment in a crane lifting operation to avoid collision between the crane (or the lifted object) and an obstacle. However, due to factors such as limited viewing field of the operating room and obstruction of the visual field by the obstacle, it is difficult for the operator to know the change of the obstacle in the surrounding environment in real time. Therefore, in a complicated operating environment, more than one assistant is often needed to provide assistance in the lifting operation. In general, the assistants need to observe at different locations around the crane and alarm the operator by a telephone, a two way radio, or the like when there is a danger of collision. However, a danger of collision will may occur if the observation of the assistants is insufficient or if an alarm cannot be issued timely.

The virtual wall technology is a technology to avoid collisions with obstacles during a crane operation with artificially specifying operating boundaries as basic idea. The virtual wall technology can be implemented as follows: positions of obstacles relative to the crane are determined before the crane lifting operation starts; and then upper, lower, front, rear, left and right operating boundaries for the crane lifting operation are set; a warning is issued during the crane lifting operation when the crane approaches the operating boundaries to remind the operator, so as to ensure the safety of the crane lifting operation.

However, the virtual wall technology has the following disadvantages:

1. The operating boundaries can only prevent the crane from actively colliding with obstacles, but cannot prevent moving obstacles from colliding with the crane. For example, a crane may collide with a moving obstacle such as another crane entering into the specified operating boundary of the crane when operating within the specified operating boundary without warning. The safety of the crane operation cannot be guaranteed.

2. The operating boundaries are static boundaries and need to be manually reset with changing operating environment;

3. The operating boundaries are specified for the crane and a problem of collision between the lifted object and obstacles cannot be solved.

SUMMARY

According to one aspect of embodiments of the present disclosure, a method for controlling operation of a crane is provided. The method comprises: scanning dynamically, by a 3D imaging device, a plurality of objects within an operating range of the crane to obtain 3D spatial information of each of the plurality of objects, wherein the plurality of objects comprises the crane and an obstacle, and the 3D spatial information comprises 3D spatial coordinates; determining a distance from the obstacle to a preset position of the crane based on the 3D spatial coordinates of the crane and the obstacle; judging whether the distance from the obstacle to the preset position is less than a preset distance corresponding to the preset position; and performing an alarm if the distance from the obstacle to the preset position is less than the preset distance corresponding to the preset position.

In an embodiment, the obstacle comprises a moving obstacle.

In an embodiment, the preset position comprises at least one of a slewing center or a boom head.

In an embodiment, determining the distance comprises: determining 3D spatial relative coordinates of the obstacle and the preset position with a slewing center of the crane as an origin of a 3D spatial relative coordinate system; determining the distance from the obstacle to the preset position according to the 3D spatial relative coordinates of the obstacle and the preset position.

In an embodiment, the preset distance corresponding to the preset position comprises a warning distance and an early warning distance greater than the warning distance; performing the alarm comprises: performing an early warning if the distance from the obstacle to the preset position is between the warning distance and the early warning distance; performing a warning if the distance from the obstacle to the preset position is less than the warning distance.

In an embodiment, the plurality of objects further comprises an object to be lifted, and the method further comprises: determining a distance from the obstacle to the object to be lifted based on 3D spatial coordinates of the object to be lifted and the obstacle after the object to be lifted is lifted; judging whether the distance from the obstacle to the object to be lifted is less than a preset distance corresponding to the object to be lifted; and performing an alarm if the distance from the obstacle to the object to be lifted is less than the preset distance corresponding to the object to be lifted.

In an embodiment, the plurality of objects further comprises an object to be lifted, and the method further comprises: determining 3D spatial relative coordinates of the crane and the object to be lifted with a slewing center of the crane as an origin of a 3D spatial relative coordinate system; obtaining working state information of the crane before the object to be lifted is lifted, wherein the working state information comprises a current slewing angle, a current telescopic length of a boom, a current luffing angle of the boom, and a current lifting height of a hook; and controlling, according to the 3D spatial relative coordinates of the crane and the object to be lifted, and the working state information, the crane to perform a slewing action, a telescopic action of the boom, a luffing action of the boom, and a lifting and lowering action of the hook to lift the object to be lifted.

In an embodiment, controlling the crane comprises: determining a target slewing angle according to the 3D spatial relative coordinates of the crane and the object to be lifted, and the working state information; controlling the crane to perform the slewing action to reach the target slewing angle; judging whether a projection of the hook is able to overlap with the object to be lifted by performing the luffing action of the boom alone, controlling, if yes, the crane to perform the luffing action of the boom alone to make the projection of the hook overlap with the object to be lifted, controlling, if no, the crane to perform the telescopic action of the boom alone to make the projection of the hook overlap with the object to be lifted, or perform both the luffing action of the boom and the telescopic action of the boom to make the projection of the hook overlap with the object to be lifted; and controlling the crane to perform the lifting and lowering action of the hook to lift the object to be lifted.

In an embodiment, controlling the crane to perform the telescopic action alone, or perform both the luffing action of the boom and the telescopic action of the boom comprises: determining a time $T_1$ required to perform the telescopic action of the boom alone to make the projection of the hook overlap with the object to be lifted, and a time $T_2$ required to perform both the luffing action of the boom and the telescopic action of the boom to make the projection of the hook overlap with the object to be lifted; comparing $T_1$ with $T_2$; controlling, if $T_1$ is less than $T_2$, the crane to perform the telescopic action of the boom alone to make the projection of the hook overlap with the object to be lifted; controlling, if $T_1$ is greater than $T_2$, the crane to perform both the luffing action of the boom and the telescopic action of the boom to make the projection of the hook overlap with the object to be lifted.

In an embodiment, the obstacle is located between the crane and an object to be lifted, and the method further comprises: determining a length, a width, and a height of the obstacle according to the 3D spatial coordinates of the obstacle, wherein the length, the width and the height of the obstacle are used to assist a boom of the crane to operate across the obstacle.

In an embodiment, the 3D spatial information further comprises color information and inverse color rate information, and the method further comprises: establishing a 3D spatial model of the obstacle based on the 3D spatial information of the obstacle; and sending an image information representing the 3D spatial model of the obstacle to an in-vehicle display to assist the crane to operate.

In an embodiment, the 3D imaging device is carried by a movable platform to rotate over the crane and dynamically scan the plurality of objects within the operating range of the crane.

In an embodiment, the movable platform comprises an unmanned aerial vehicle.

According to another aspect of embodiments of the present disclosure, a system for controlling operation of a crane is provided. The system comprises a 3D imaging device and a control device. The 3D imaging device is used for scanning dynamically a plurality of objects within an operating range of the crane to obtain 3D spatial information of each of the plurality of objects, and sending the 3D spatial information of each of the plurality of objects to the control device, wherein the plurality of objects comprises the crane and an obstacle, and the 3D spatial information comprises 3D spatial coordinates. The control device comprises: a distance determining unit for determining a distance from the obstacle to a preset position of the crane based on the 3D spatial coordinates of the crane and the obstacle; a distance judging unit for judging whether the distance from the obstacle to the preset position is less than a preset distance corresponding to the preset position; and an alarm unit for performing an alarm if the distance from the obstacle to the preset position is less than the preset distance corresponding to the preset position.

In an embodiment, the obstacle comprises a moving obstacle.

In an embodiment, the preset position comprises at least one of a slewing center or a boom head.

In an embodiment, the distance determining unit comprises: a coordinate determining module for determining 3D spatial relative coordinates of the obstacle and the preset position with a slewing center of the crane as an origin of a 3D spatial relative coordinate system; and a distance determining module for determining the distance from the obstacle to the preset position according to the 3D spatial relative coordinates of the obstacle and the preset position.

In an embodiment, the preset distance corresponding to the preset position comprises a warning distance and an early warning distance greater than the warning distance; the alarm unit is used for performing an early warning if the distance from the obstacle to the preset position is between the warning distance and the early warning distance, and performing a warning if the distance from the obstacle to the preset position is less than the warning distance.

In an embodiment, the plurality of objects further comprises an object to be lifted; the distance determining unit is further used for determining a distance from the obstacle to the object to be lifted based on 3D spatial coordinates of the object to be lifted and the obstacle after the object to be lifted is lifted; the distance judging unit is further used for judging whether the distance from the obstacle to the object to be lifted is less than a preset distance corresponding to the object to be lifted; the alarm unit is further used for performing an alarm if the distance from the obstacle to the object to be lifted is less than the preset distance corresponding to the object to be lifted.

In an embodiment, the plurality of objects further comprises an object to be lifted; the control device further comprises: a coordinate determining unit for determining 3D spatial relative coordinates of the crane and the object to be lifted with a slewing center of the crane as an origin of a 3D spatial relative coordinate system; and a state obtaining unit for obtaining working state information of the crane before the object to be lifted is lifted, wherein the working state information comprises a current slewing angle, a current telescopic length of a boom, a current luffing angle of the boom, and a current lifting height of a hook; and a control unit for, according to the 3D spatial relative coordinates of the crane and the object to be lifted and the working state information, controlling the crane to perform a slewing action, a telescopic action of the boom, a luffing action of the boom, and a lifting and lowering action of the hook to lift the object to be lifted.

In an embodiment, the control unit comprises: a calculation module for determining a target slewing angle according to the 3D spatial relative coordinates of the crane and the object to be lifted, and the working state information; a judgment module for judging whether a projection of the hook is able to overlap with the object to be lifted by performing the luffing action of the boom alone; and a control module for controlling the crane to perform the slewing action to rotate to reach the target slewing angle; controlling, if the projection of the hook is able to overlap with the object to be lifted by performing the luffing action of the boom alone, the crane to perform the luffing action of the boom alone to make the projection of the hook overlap with the object to be lifted; controlling, if the projection of the hook is able to overlap with the object to be lifted by performing the luffing action of the boom alone, the crane to perform the telescopic action of the boom alone, or perform both the luffing action of the boom and the telescopic action of the boom to make the projection of the hook overlap with the object to be lifted; and controlling the crane to perform the lifting and lowering action of the hook to lift the object to be lifted.

In an embodiment, the control module is further used for: determining a time $T_1$ required to perform the telescopic action of the boom alone to make the projection of the hook overlap with the object to be lifted, and a time $T_2$ required to perform both the luffing action of the boom and the telescopic action of the boom to make the projection of the hook overlap with the object to be lifted; comparing $T_1$ with $T_2$; controlling, if $T_1$ is less than $T_2$, the crane to perform the telescopic action of the boom alone to make the projection of the hook overlap with the object to be lifted; controlling, if $T_1$ is greater than $T_2$, the crane to perform both the luffing action of the boom and the telescopic action of the boom to make the projection of the hook overlap with the object to be lifted.

In an embodiment, the obstacle is located between the crane and an object to be lifted, and the control device further comprises: an obstacle information determining unit for determining a length, a width, and a height of the obstacle according to the 3D spatial coordinates of the obstacle, wherein the length, the width and the height of the obstacle are used to assist a boom of the crane to operate across the obstacle.

In an embodiment, the 3D spatial information further comprises color information and inverse color rate information, and the device further comprises: a model establishing unit for establishing a 3D spatial model of the obstacle based on the 3D spatial information of the obstacle; and an image information sending unit for sending an image information representing the 3D spatial model of the obstacle to an in-vehicle display to assist the crane to operate.

In an embodiment, the system further comprises a movable platform for carrying the 3D imaging device to rotate over the crane and dynamically scan the plurality of objects within the operating range of the crane.

In an embodiment, the movable platform comprises an unmanned aerial vehicle.

According to still another aspect of embodiments of the present disclosure, a crane is provided. The crane comprises the system for controlling operation of a crane according to any one of the above embodiments.

Below, the technical solutions of the present disclosure will be further described in detail with reference to the accompanying drawings and embodiments.

BRIEF DESCRIPTION OF THE DRAWINGS

In order to more clearly explain the embodiments of the present disclosure or the technical solutions in the related art, a brief introduction will be given below for the drawings required to be used in the description of the embodiments or the related art. It is obvious that the drawings illustrated as follows are merely some of the embodiments of the present disclosure. A person skilled in the art may also acquire other drawings according to such drawings on the premise that no inventive effort is involved.

DETAILED DESCRIPTION

Figure 1:
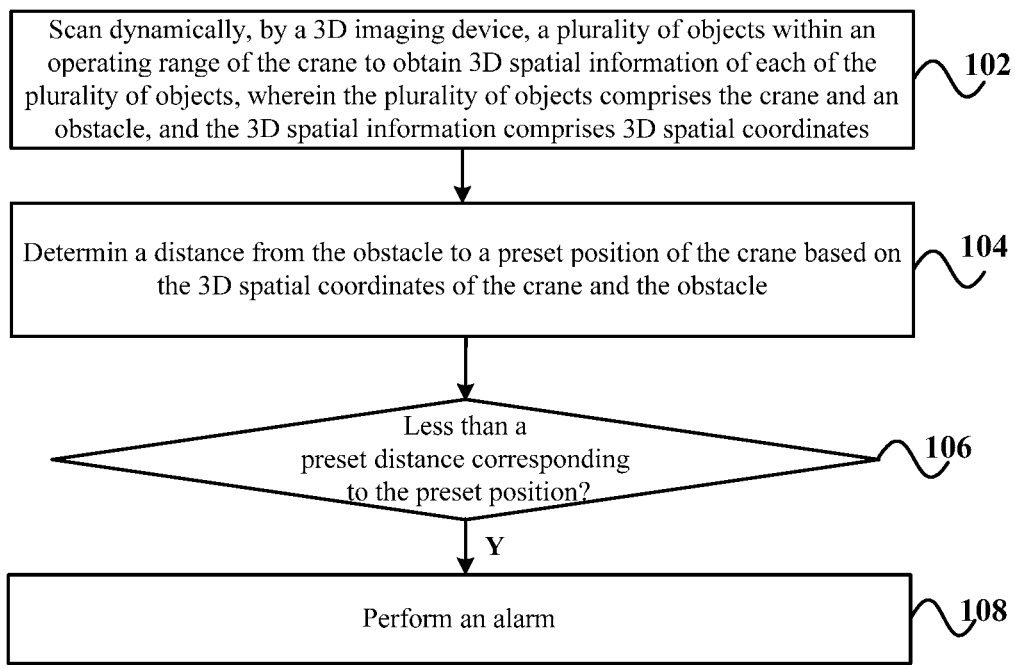
FIG. 1 is a simplified schematic flow chart showing a method for controlling operation of a crane according to an embodiment of the present disclosure.

Below, a clear and complete description will be given for the technical solutions of embodiments of the present disclosure with reference to the drawings. Obviously, merely some rather than all of the embodiments of present disclosure are given herein. All other embodiments obtained by those of the ordinary skill in the art based on the embodiments of the present disclosure without creative efforts shall fall within the protection scope of the present disclosure.

Unless otherwise specified, the relative arrangement, numerical expressions and numerical values of the components and steps set forth in these examples do not limit the scope of the present disclosure.

At the same time, it should be understood that, for ease of description, the dimensions of the various parts shown in the drawings are not necessary drawn to actual proportions.

Techniques, methods, and apparatus known to those of ordinary skill in the relevant art may not be discussed in detail, but where appropriate, these techniques, methods, and apparatuses should be considered as part of this specification.

Of all the examples shown and discussed herein, any specific value should be explained as merely illustrative and not as a limitation. Thus, other examples of exemplary embodiments may have different values.

Notice that, similar reference numerals and letters are denoted by the like in the accompanying drawings, and therefore, once an item is defined in a drawing, there is no need for further discussion in the subsequent drawings.

First, some relevant terms used in the present disclosure will be explained.

Crane: lifting machinery that can lift and horizontally carry heavy objects within a certain range, also known as a hoist.

Mobile crane: boom slewing crane that uses a tire chassis or a crawler chassis to walk, consisting of two parts: the upper vehicle part and the lower vehicle part. In a lifting operation, the lower vehicle part is supported on the ground, and the upper vehicle part completes the lifting operation by performing actions such as luffing action, telescopic action, lifting and lowering action, and slewing action, etc. Mobile crane may comprise, for example, a truck crane, an all terrain crane, a wheel crane, a crawler crane, or the like.

3D imaging device/3D imager: A device able to obtain 3D spatial information of an object by performing spatial recognition with optical measuring elements and fast scanning techniques. Here, the 3D spatial information may comprise 3D spatial coordinates (i.e., X, Y, and Z distance information), color information (i.e., R, G, and B information) and inverse color rate information of the object. The 3D imaging device can send the 3D spatial information to a processor, which can reconstruct a 3D image based on the human brain imaging principle and color related knowledge.

FIG. 1 is a simplified schematic flow chart showing a method for controlling operation of a crane according to an embodiment of the present disclosure.

As shown in FIG. 1, at step 102, a plurality of objects within a crane operation range are dynamically scanned by a 3D imaging device to obtain 3D spatial information of each of the plurality of objects. The 3D spatial information comprises, but not limited to, 3D spatial coordinates, color information and inverse color rate information. The 3D spatial information can be sent to a control device for subsequent processing by the 3D imaging device after being obtained.

The plurality of objects herein may comprise a crane and an obstacle. The obstacle may comprise a moving obstacle. It should be noted that since the crane and the obstacle are both 3D objects, the obtained 3D space coordinates of the crane may theoretically comprise 3D spatial coordinates of each point of the crane, and the obtained 3D space coordinates of the obstacle may comprise 3D spatial coordinates of each point of the obstacle.

For example, the 3D imaging device can be carried by a movable platform (for example, an unmanned aerial vehicle, etc.) to rotate over the crane, so that objects within the crane operating range can be dynamically scanned to obtain 3D spatial information of the scanned objects. If the obstacle in the operating range changes, for example, moves out of the operating range, or a new obstacle enters into the operating range, the 3D spatial information of the changed obstacle within the operating range can still be obtained by the 3D imaging device in real time.

At step 104, a distance from the obstacle to a preset position of the crane is determined based on the 3D spatial coordinates of the crane and the obstacle.

The preset position of the crane can be set according to actual conditions. For example, the preset position may be a part where the crane easily collides with an obstacle, such as the boom head. As another example, the preset position may also be a central part of the crane, for example, a slewing center.

In one implementation, the distance from the obstacle to the preset position of the crane can be determined by following way.

Firstly, 3D spatial relative coordinates of the obstacle and the preset position are determined with a slewing center of the crane as an origin of a 3D spatial relative coordinate system.

3D spatial relative coordinates corresponding to the 3D spatial coordinates of the obstacle can be obtained according to a correspondence between the 3D spatial coordinate and the 3D spatial relative coordinate (i.e., the origin) of the slewing center of the crane. For the preset position, for example, if the preset position is the slewing center, the 3D spatial relative coordinate of the preset position is the origin coordinate. If the preset position is the boom head, in one case, the 3D spatial relative coordinate corresponding to the 3D spatial coordinate of the boom head can be determined according to the correspondence between the 3D spatial coordinate and the 3D spatial relative coordinate of the slewing center of the crane; and in another case, the 3D spatial relative coordinate of the boom head can be determined according to the 3D spatial relative coordinate of the slewing center of the crane and information such as length of the boom, luffing angle of the boom, etc.

Then, a distance from the obstacle to the preset position is determined according to the 3D spatial relative coordinates of the obstacle and the preset position.

Here, the distance from the obstacle to the preset position may be a minimum distance of the distances from various points of the obstacle to the preset position.

At step 106, whether the distance from the obstacle to the preset position is less than a preset distance corresponding to the preset position is judged. If so, step 108 is executed.

In practical applications, the number of the preset position may be one or more than one. Each preset position corresponds to a preset distance. The preset distance may be set by a user on an in-vehicle display as needed, or may be pre-stored in the control device. If the distance from the obstacle to the preset position is less than the preset distance corresponding to the preset position, the obstacle may collide with a certain part of the crane (for example, the boom head or body edges).

A certain part of the crane can be prevented from colliding with an obstacle with a preset distance corresponding to the preset position being set. For example, the boom head can be prevented from colliding with an obstacle with a preset distance corresponding to the boom head being set and the body edges of the crane can be prevented from colliding with an obstacle with a preset distance corresponding to the slewing center being set. In addition, the value of the preset distance may be adjusted according to actual conditions. As a non-limiting example, the preset distance corresponding to the slewing center may be set to be slightly greater than a maximum distance of the distances from various points of the body edges to the slewing center.

At step 108, an alarm is performed.

In an implementation, the preset distances corresponding to the preset position may comprise a warning distance and an early warning distance, wherein the early warning distance is greater than the warning distance.

Different alarm manners can be used depending on the distances of the obstacle to the preset position. If the distance from the obstacle to the preset position is between the warning distance and the early warning distance, that is, the obstacle is relatively close to the preset position, an early warning can be performed. For example, a warning light is turned on to prompt the operator to pay attention and take an appropriate measure, for example, control the crane to slow down. If the distance from the obstacle to the preset position is less than the warning distance, that is, the obstacle is very close to the preset position and a collision is likely to occur, a warning can be performed. For example, a warning can be performed by an alarm element such as a buzzer or a horn to prompt the operator to pay attention and take an appropriate measure, for example, to control the crane stop operation. In addition, corresponding texts or an icon can also be output to the in-vehicle display to help to prompt the operator when an early warning or a warning is performed.

In this embodiment, the objects within the operating range of the crane can be dynamically identified to obtain 3D spatial information of the objects by the 3D imaging device, and a warning is performed in a case where the distance from an obstacle to a preset position of the crane is less than a preset distance. Compared with the related art, even if the obstacle is moving, a real-time position of the obstacle can be obtained with this embodiment to avoid collision between the moving obstacle and certain parts of the crane. Thus the occurrence of safety accidents can be reduced and the safety of the operation of the crane can be improved. In addition, in a case where the operating range of the crane changes, operating boundaries are not needed to be manually reset with the method of this embodiment, and human resources can be saved.

It should be noted that with the method of the embodiment shown in FIG. 1 before or after the object to be lifted being lifted, the distance from the obstacle to the preset position of the crane can be determined and a alarm can be performed in a case where the distance from the obstacle to the preset position of the crane is less than the preset distance to avoid collisions between certain parts of the crane and the obstacle.

In one embodiment, the 3D spatial information obtained by the 3D imaging device may comprise 3D spatial coordinates, color information, and inverse color rate information of the objects. In this case, a three-dimensional model of the obstacle can be established based on the 3D spatial information of the obstacle; and then an image information representing the three-dimensional model of the obstacle can be sent to the in-vehicle display to assist the crane operate. In this way, an image of the obstacle on the in-vehicle display can be visually observed by the operator, and the safety of the operation can be further improved.

Considering that the object to be lifted may also collide with the obstacle after being lifted, the present disclosure also provides a method for avoiding collision between the obstacle and the object to be lifted, which will be described in detail below with reference to the embodiment shown in FIG. 2.

Figure 2:
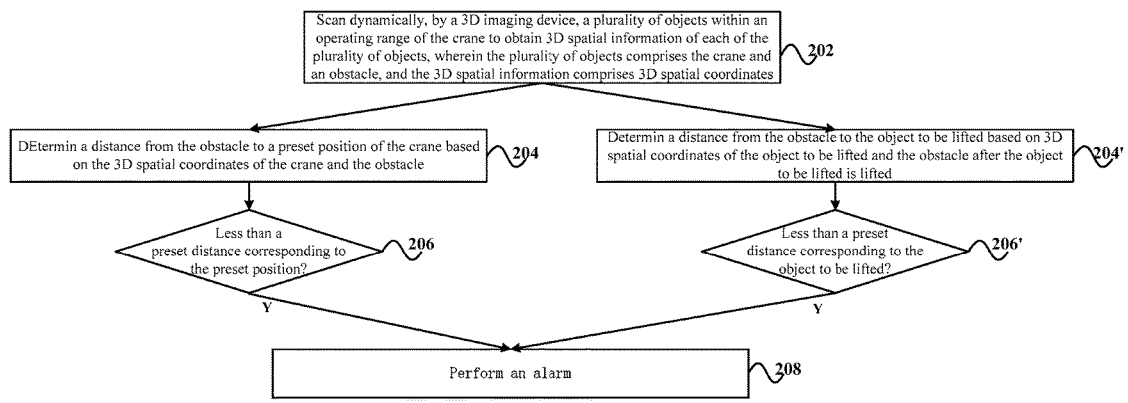
FIG. 2 is a simplified schematic flow chart showing a method for controlling operation of a crane according to another embodiment of the present disclosure.

FIG. 2 is a simplified schematic flow chart showing a method for controlling operation of a crane according to another embodiment of the present disclosure. The following focuses on the differences between the embodiment shown in FIG. 2 and the embodiment shown in FIG. 1. For other steps similar to those of FIG. 1, reference can be made to the description of FIG. 1.

As shown in FIG. 2, at step 202, a plurality of objects within a crane operation range are dynamically scanned by a 3D imaging device to obtain 3D spatial information of each of the plurality of objects. For example, the obtained 3D spatial information may be sent to a control device. Here, the plurality of objects comprises a crane, an obstacle, and an object to be lifted. The 3D spatial information comprises, but is not limited to, 3D spatial coordinates.

At step 204, a distance from the obstacle to a preset position of the crane is determined based on the 3D spatial coordinates of the crane and the obstacle.

At step 206, whether the distance from the obstacle to the preset position is less than a preset distance corresponding to the preset position is judged. If so, step 208 is executed.

At step 204', a distance from the obstacle to the object to be lifted based on 3D spatial coordinates of the object to be lifted and the obstacle is determined after the object to be lifted is lifted.

Here, the distance from the obstacle to the object to be lifted may be a minimum distance of the distances from various points of the obstacle to various points of the object to be lifted.

At step 206', whether the distance from the obstacle to the object to be lifted is less than a preset distance corresponding to the object to be lifted is judged; if so, step 208 is executed.

If the distance from the obstacle to the object to be lifted is less than a preset distance corresponding to the object to be lifted, the obstacle may collide with the object to be lifted. Therefore, the object to be lifted can be prevented from colliding with the obstacle with a preset distance corresponding to the object to be lifted being set.

At step 208, an alarm is performed.

In a case where the distance from the obstacle to the preset position is less than the preset distance corresponding to the preset position, for the alarm manner, reference can be made to the description of the above step 108, which will not be described herein.

Preset distances corresponding to the object to be lifted may also similarly comprise a warning distance and an early warning distance greater than the warning distance. In a case where the distance from the obstacle to the object to be lifted is less than the preset distance corresponding to the object to be lifted, different alarm manners can be used depending on the distances of the obstacle to the object to be lifted. If the distance from the obstacle to the object to be lifted is between the warning distance and the early warning distance, an early warning can be performed. For example, a warning light is turned on to prompt the operator to pay attention and take an appropriate measure, for example, control the crane to slow down. If the distance from the obstacle to the object to be lifted is less than the warning distance, a warning may be performed. For example, a warning can be performed by an alarm element such as a buzzer or a horn to prompt the operator to pay attention and take an appropriate measure, for example, to control the crane stop operation.

Implementations of the above steps 202 to 206, reference can be made to the description of steps 102 to 106 shown in FIG. 1, which will not be described herein.

Not only certain parts of the crane can be avoided to collide with the obstacle, but also the object to be lifted can be avoided to collide with the obstacle in this embodiment. The occurrence of safety accidents can be further reduced and the safety of the operation of the crane can be further improved.

In addition, considering that more than one operation is needed before the object to be lifted is lifted by the crane, the present disclosure also provides a method for optimizing the operating path of the crane before lifting the object to be lifted, which will be described in detail below with reference to the embodiment shown in FIG. 3, to improve the operating efficiency of the crane on the premise of ensuring safe operation.

Figure 3:
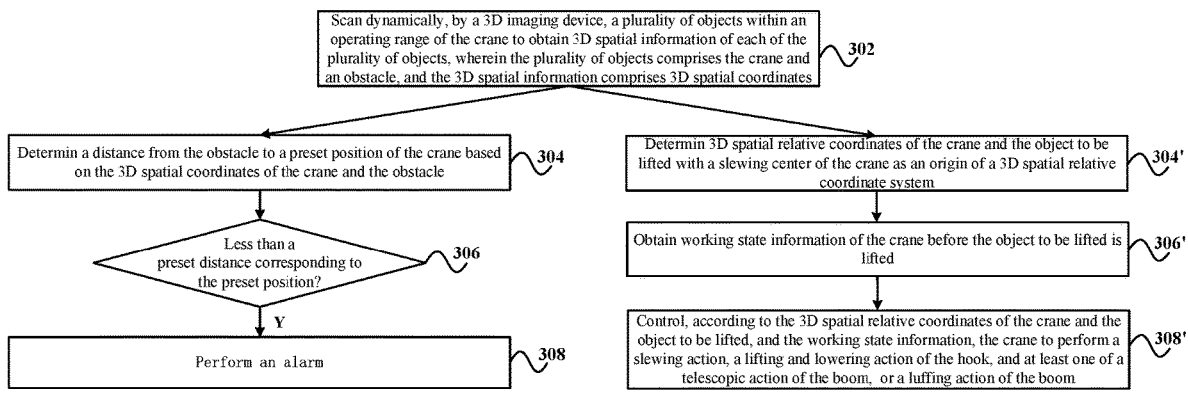
FIG. 3 is a simplified schematic flow chart showing a method for controlling operation of a crane according to still another embodiment of the present disclosure.

FIG. 3 is a simplified schematic flow chart showing a method for controlling operation of a crane according to still another embodiment of the present disclosure. The following focuses on the differences between the embodiment shown in FIG. 3 and the embodiment shown in FIG. 1. For other steps similar to those of FIG. 1, reference can be made to the description of FIG. 1.

As shown in FIG. 3, at step 302, a plurality of objects within a crane operation range are dynamically scanned by a 3D imaging device to obtain 3D spatial information of each of the plurality of objects. For example, the obtained 3D spatial information may be sent to a control device. Here, the plurality of objects comprises a crane, an obstacle, and an object to be lifted. The 3D spatial information comprises, but is not limited to, 3D spatial coordinates.

At step 304, a distance from the obstacle to a preset position of the crane is determined based on the 3D spatial coordinates of the crane and the obstacle.

At step 306, whether the distance from the obstacle to the preset position is less than a preset distance corresponding to the preset position is judged. If so, step 308 is executed.

At step 308, an alarm is performed.

At step 304', 3D spatial relative coordinates of the crane and the object to be lifted are determined with a slewing center of the crane as an origin of a 3D spatial relative coordinate system;

3D spatial relative coordinates corresponding to the 3D spatial coordinates of various points of the crane and 3D spatial relative coordinates corresponding to the 3D spatial coordinates of various points of the object to be lifted can be obtained according to the correspondence between the 3D spatial coordinate and the 3D spatial relative coordinate (i.e., the origin) of the slewing center of the crane.

At step 306', working state information of the crane before the object to be lifted is lifted is obtained. Here, the working state information comprises a current slewing angle, a current telescopic length of the boom, a current luffing angle of the boom, and a current lifting height of a hook.

At step 308', the crane is controlled to perform a slewing action, a lifting and lowering action of the hook, and at least one of a telescopic action of the boom or a luffing action of the boom to lift the object to be lifted according to the 3D spatial relative coordinates of the crane and the object to be lifted, and the working state information.

The implementations of the above steps 302 to 308, reference can be made to the description of steps 102 to 108 shown in FIG. 1, which will not be described herein.

In this embodiment, the crane can be controlled to perform various actions to lift the object to be lifted according to the 3D relative coordinates of the crane and the object to be lifted, and the working state information. Furthermore, in the process of performing each action, an alarm may be performed in a case where the distance from the obstacle to a preset position of the crane is less than a preset distance corresponding to the preset position, thus the safety of the operation of the crane can be ensured.

Figure 4:
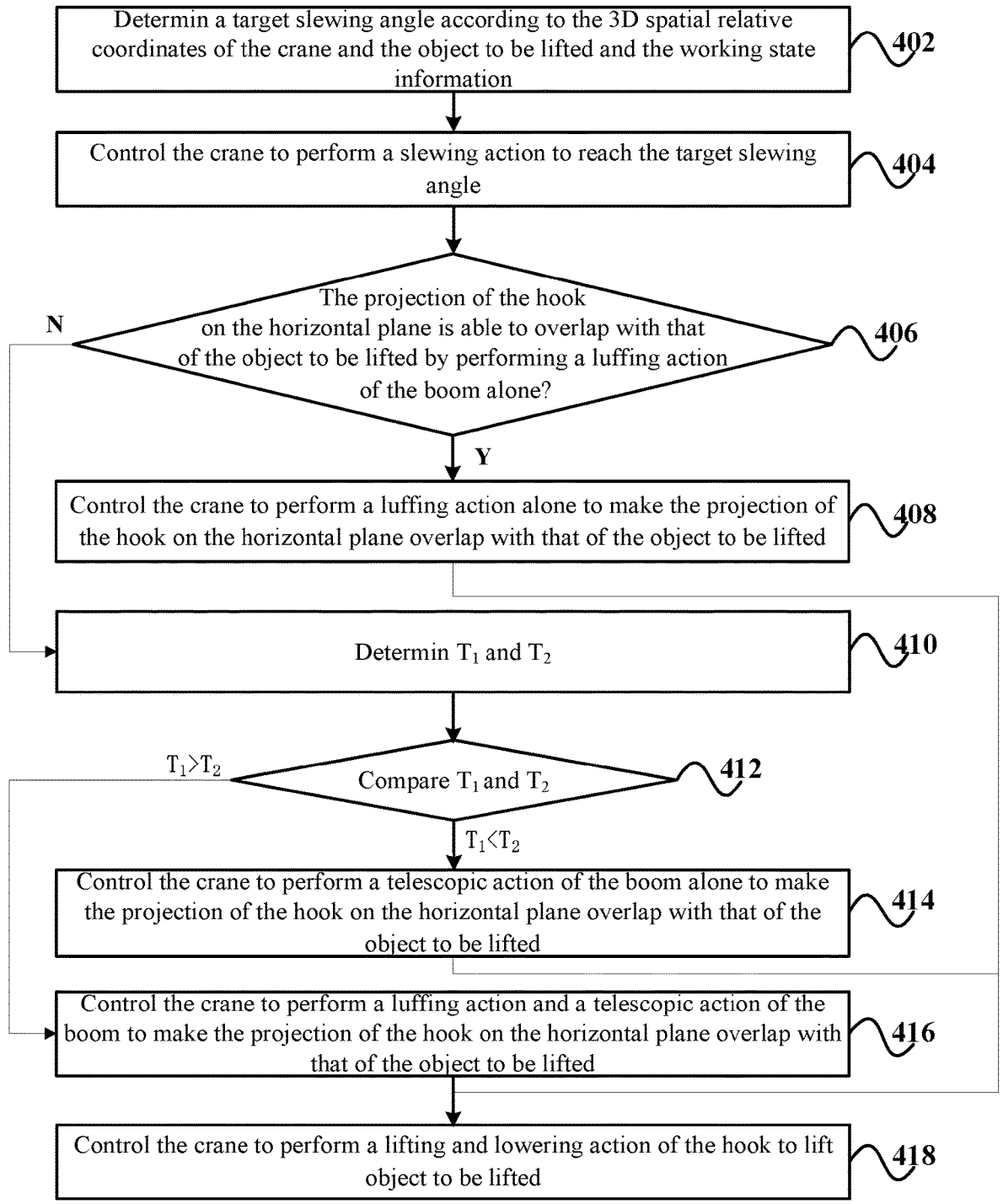
FIG. 4 is a simplified schematic flow chart showing an implementation of step 308' in FIG. 3.

FIG. 4 is a simplified schematic flow chart showing an implementation of step 308' in FIG. 3.

As shown in FIG. 4, at step 402, a target slewing angle is determined according to the 3D spatial relative coordinates of the crane and the object to be lifted, and the working state information.

According to the 3D spatial relative coordinates of the crane and the object to be lifted, a relative position of the crane relative to the object to be lifted can be known, and thus a target slewing angle can be determined according to the relative position of the crane relative to the object to be lifted and the current slewing angle.

At step 404, the crane is controlled to perform a slewing action to reach the target slewing angle, so that the boom and the object to be lifted are substantially in a same plane perpendicular to horizontal plane, that is, the projection of the object to be lifted on the horizontal plane is located on a straight line where the projection of the boom on the horizontal plane is located.

In some embodiments, before the crane is controlled to perform the slewing action, the hook can be controlled to lift a certain height to avoid collision between the hook and the legs of the crane.

At step 406, whether the projection of the hook on the horizontal plane is able to overlap with the projection of the object to be lifted on the horizontal plane by performing a luffing action of the boom alone is judged to obtain a judgment result. If the judgment result is yes, step 408 is executed and then step 418 is executed; if the judgment result is no, step 410 is executed.

Assume that the distance between the crane and the object to be lifted is d, the current telescopic length of the boom is $l_0$, the maximum luffing angle of the boom is $\alpha_{max}$, and the minimum luffing angle of the boom is $\alpha_{min}$. Whether d satisfies $l_0 \cos_{\alpha max} < d < l_0 \cos_{\alpha min}$ is judged. If d satisfies $l_0 \cos_{\alpha max} < d < l_0 \cos_{\alpha min}$, the projection of the hook on the horizontal plane is able to overlap with that of the object to be lifted by performing a luffing action alone. Otherwise, the projection of the hook on the horizontal plane is not able to overlap with that of the object to be lifted by performing a luffing action alone.

At step 408, the crane is controlled to perform a luffing action of the boom alone to make the projection of the hook on the horizontal plane overlap with that of the object to be lifted.

At step 410, a time $T_1$ required to perform a telescopic action of the boom alone to make the projection of the hook on the horizontal plane overlap with that of the object to be lifted, and a time $T_2$ required to perform a luffing action of the boom and a telescopic action of the boom to make the projection of the hook on the horizontal plane overlap with that of the object to be lifted are determined.

First, a method for determining $T_1$ will be introduced.

Assume that the distance between the crane and the object to be lifted is d, the current luffing angle of the boom is $\alpha_0$, and the current telescopic length of the boom is $l_0$. A target telescopic length of the boom can be determined as $l_1 = d/\cos_{\alpha 0}$. Therefore, the value of $T_1$ can be obtained according to the formula $T_1 = K_1(l_1 - l_0)$, where $K_1$ is the time required for a change in a unit length of the boom.

Next, a method for determining $T_2$ will be introduced.

The time T required to perform both a luffing action of the boom and a telescopic action of the boom to make the projection of the hook on the horizontal plane overlap with that of the object to be lifted can be expressed as $T = K_1 (l - l_0) + K_2 (\alpha - \alpha_0) + \varepsilon$, where l is the telescopic length of the boom, $\alpha$ is the luffing angle of the boom, l cos $\alpha = d$, $l_{min} \leq l \leq l_{max}$, $\alpha_{min} \leq \alpha \leq \alpha_{max}$, $K_2$ is the time required for a change in a unit luffing angle of the boom, is a time required for switching between the luffing action of the boom and the telescopic action of the boom.

T changes with changing l and $\alpha$. Therefore, under the condition that l cos $\alpha = d$, $l_{min} \leq l \leq l_{max}$, and $\alpha_{min} \leq \alpha \leq \alpha_{max}$, a minimum value $T_{min}$ of T can be obtained. The minimum value $T_{min}$ of T can be taken as $T_2$.

At step 412, $T_1$ is compared with $T_2$. If $T_1$ is less than $T_2$, step 414 is executed and then execute step 418 is executed; if $T_1$ is greater than $T_2$, step 416 is executed and then step 418 is executed.

At step 414, the crane is controlled to perform a telescopic action of the boom alone to make the projection of the hook on the horizontal plane overlap with that of the object to be lifted.

At step 416, the crane is controlled to perform both a luffing action of the boom and a telescopic action of the boom to make the projection of the hook on the horizontal plane overlap with that of the object to be lifted.

At step 418, the crane is controlled to perform a lifting and lowering action of the hook to lift object to be lifted.

In the above implementation, the slewing action, luffing action of the boom, telescopic action of the boom, and lifting and lowering action of the hook, may be prioritized from high to low in this order. In a case where the projection of the hook on the horizontal plane is able to overlap with that of the object to be lifted by performing a luffing action of the boom, a luffing action of the boom is performed alone to make the projection of the hook on the horizontal plane overlap with that of the object to be lifted to improve operating efficiency of the crane as the efficiency of the luffing action of the boom is higher than that of the telescopic action of the boom. Further, in a case where the projection of the hook on the horizontal plane is not able to overlap with that of the object to be lifted by performing a luffing action of the boom alone, the operating efficiency of the crane can be further improved by selecting a method that take a less time to make the projection of the hook on the horizontal plane overlap with that of the object to be lifted.

It should be noted that, in another implementation, step 410 and step 412 shown in FIG. 4 may be not executed, that is, in a case where the judgment result of step 406 is no, step 414 or 416 may be directly executed, and then step 418 is executed.

In still another implementation, the following step may be comprised between step 404 and step 406 shown in FIG. 4: whether the projection of the hook on the horizontal plane is able to overlap with that of the object to be lifted by performing at least one of a luffing action of the boom or a telescopic action of the boom make; if yes, step 406 is executed; if no, the position of the crane can be moved such that the projection of the hook on the horizontal plane is able to overlap with that of the object to be lifted by performing at least one of a luffing action of the boom or a telescopic action of the boom.

A method for determining whether the projection of the hook on the horizontal plane is able to overlap with that of the object to be lifted by performing at least one of a luffing action of the boom or a telescopic action of the boom will be introduced below.

Assume that the distance between the crane and the object to be lifted is d, the minimum telescopic length of the boom is $l_{min}$, the maximum telescopic length of the boom is $l_{max}$, the maximum luffing angle of the boom is $\alpha_{max}$, and the minimum luffing angle of the boom is $\alpha_{min}$. Whether d satisfies $l_{min} \cos \alpha_{max} < d < l_{max} \cos \alpha_{min}$ is judged. If d satisfies $l_{min} \cos \alpha_{max} < d < l_{max} \cos \alpha_{min}$, the projection of the hook on the horizontal plane is able to overlap with that of the object to be lifted by performing at least one of a luffing action of the boom or a telescopic action of the boom. Otherwise, the projection of the hook on the horizontal plane is not able to overlap with that of the object to be lifted by performing at least one of a luffing action of the boom or a telescopic action of the boom.

In addition, if the obstacle is located between the crane and the object to be lifted, the length, the width and the height of the obstacle can also be determined according to the 3D spatial coordinates of the obstacle. The length, the width and the height of the obstacle are used to assist the crane boom to operate across the obstacle. For example, the obstacle is a wall, and the crane and the object to be lifted are located on both sides of the wall, respectively. The crane needs to lift the object to be lifted across the wall, and also needs to cross the wall after lifting the object to be lifted. Therefore, in practical applications, the crane boom can be assisted to operate across an obstacle according to the length, the width and the height information of the obstacle, that is, a collision between the crane and an obstacle can be avoided actively by the crane during the operation.

Figure 5:
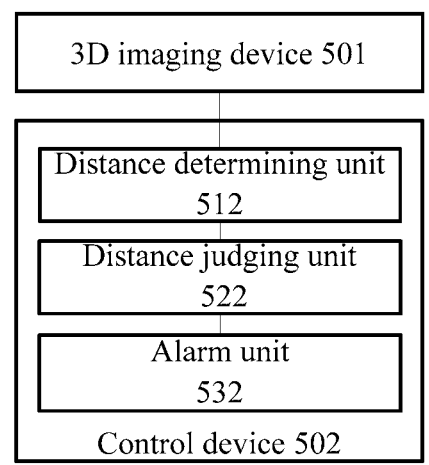
FIG. 5 is a schematic structural view showing a system for controlling operation of a crane according to an embodiment of the present disclosure.

FIG. 5 is a schematic structural view showing a system for controlling operation of a crane according to an embodiment of the present disclosure. As shown in FIG. 5, the control system comprises a 3D imaging device 501 and a control device 502.

The 3D imaging device 501 is used to scanning dynamically a plurality of objects comprising the crane and an obstacle within an operating range of the crane to obtain 3D spatial information of each of the plurality of objects, and sending the 3D spatial information of each of the plurality of objects to the control device 502. The plurality of objects herein may comprise the crane and an obstacle. The obstacle comprises a moving obstacle. The 3D spatial information comprises, but not limited to, 3D spatial coordinates.

The control device 502 comprises a distance determining unit 512, a distance judging unit 522, and a alarm unit 532.

The distance determining unit 512 is for determining a distance from the obstacle to a preset position of the crane based on the 3D spatial coordinates of the crane and the obstacle. The preset position herein may comprise at least one of a swivel center or a boom head.

The distance judging unit 522 is for judging whether the distance from the obstacle to the preset position is less than a preset distance corresponding to the preset position.

The waring unit 532 is for performing an alarm if the distance from the obstacle to the preset position is less than the preset distance corresponding to the preset position. In an implementation, the preset distances corresponding to the preset position may comprise a warning distance and an early warning distance, wherein the early warning distance is greater than the warning distance. The alarm unit 532 may be used for performing an early warning if the distance from the obstacle to the preset position is between the warning distance and the early warning distance, and performing a warning if the distance from the obstacle to the preset position is less than the warning distance.

In this embodiment, the objects within the operating range of the crane can be dynamically identified to obtain 3D spatial information of the objects by the 3D imaging device, and a warning is performed in a case where the distance from an obstacle to a preset position of the crane is less than a preset distance. Compared with the related art, even if the obstacle is moving, a real-time position of the obstacle can be obtained with this embodiment to avoid collision between the moving obstacle and certain parts of the crane. Thus the occurrence of safety accidents can be reduced and the safety of the operation of the crane can be improved. In addition, in a case where the operating range of the crane changes, operating boundaries are not needed to be manually reset with the method of this embodiment, and human resources can be saved.

It should be noted that the control device 502 may comprise a plurality of components, and accordingly, the functions of the distance determining unit 512, the distance judging unit 522, and the alarm unit 532 may be implemented by different components. For example, in practical applications, a general in-vehicle controller may only have limited processing capability, thus the control device 502 may comprise a processor and an in-vehicle controller. For example, the function of the distance determining unit 512 can be implemented by a processor, and the functions of the distance judging unit 522 and the alarm unit 532 can be implemented by an in-vehicle controller.

In one embodiment, the 3D spatial information obtained by the 3D imaging device 501 may comprise 3D spatial coordinates, color information, and inverse color rate information of the objects. In this embodiment, the control device 502 may comprise a model establishing unit and an image information sending unit. The model establishing unit is used for establishing a 3D spatial model of the obstacle based on the 3D spatial information of the obstacle, and the image information sending unit is used for sending an image information representing the 3D spatial model of the obstacle to an in-vehicle display to assist the crane to operate. In this way, the image of the obstacle on the in-vehicle display can be visually observed by the operator, thus the safety of the operation can be further improved. It should be understood that in a case where the control device comprises a processor and an in-vehicle controller, the functions of the above model establishing unit and image information sending unit may be implemented by the processor.

Figure 6:
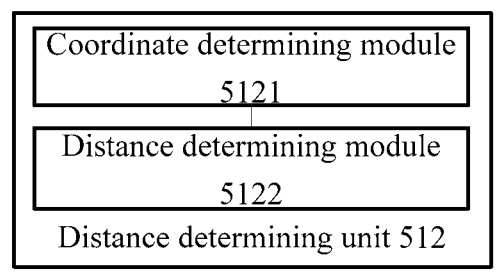
FIG. 6 is a schematic structural view showing an implementation of the distance determining unit in FIG. 5.

FIG. 6 is a schematic structural view showing an implementation of the distance determining unit in FIG. 5. As shown in FIG. 6, the distance determining unit 512 comprises a coordinate determining module 5121 and a distance determining module 5122. The coordinate determining module 5121 is used for, with a slewing center of the crane as an origin of a 3D spatial relative coordinate system, determining 3D spatial relative coordinates of the obstacle and the preset position. The distance determining module 5122 is used for determining a distance from the obstacle to the preset position according to the 3D spatial relative coordinates of the obstacle and the preset position.

In order to avoid a collision between the obstacle and the object to be lifted, in one embodiment, referring to FIG. 5, the 3D imaging device 501 may be used for dynamically scanning a plurality of objects within the operating range of the crane to obtain 3D spatial information (comprising, but not limited to, 3D spatial coordinates) of each of the plurality of objects, and sending the 3D spatial information of each of the plurality of objects to the control device 502. Here, the objects comprise a crane, an obstacle, and an object to be lifted. Correspondingly, in this embodiment, the distance determining unit 512 may be further used for, after lifting the object to be lifted, determining a distance from the obstacle to the object to be lifted based on the 3D spatial coordinates of the object to be lifted and the obstacle; the distance determining unit 522 may be further used for determining whether the distance from the obstacle to the object to be lifted is less than a preset distance corresponding to the object to be lifted; and the alarm unit 532 may be further used for performing an alarm if the distance from the obstacle to the object to be lifted is less than the preset distance corresponding to the object to be lifted.

Not only certain parts of the crane can be avoided to collide with the obstacle, but also the object to be lifted can be avoided to collide with the obstacle in this embodiment. The occurrence of safety accidents can be further reduced and the safety of the operation of the crane can be further improved.

Figure 7:
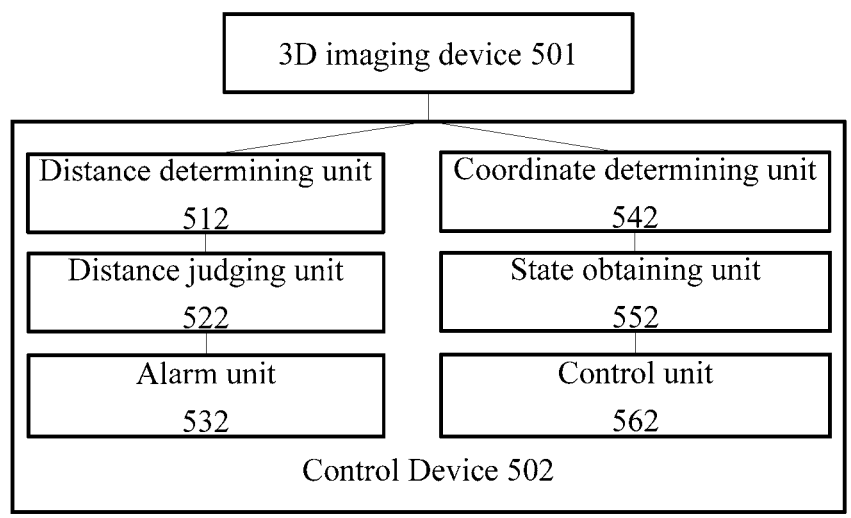
FIG. 7 is a schematic structural view showing a system for controlling operation of a crane according to another embodiment of the present disclosure.

FIG. 7 is a schematic structural view showing a system for controlling operation of a crane according to another embodiment of the present disclosure. In this embodiment, the 3D imaging device 501 is used for dynamically scanning a plurality of objects within an operating range of the crane to obtain 3D spatial information of each of the plurality of the objects, and sending the 3D spatial information of each of the plurality of the objects to the control device 502. Here, the plurality of objects comprises the crane, an obstacle, and an object to be lifted. The 3D spatial information comprises 3D spatial coordinates. The control device 502 further comprises a coordinate determining unit 542, a state obtaining unit 552, and a control unit 562 other than the distance determining unit 512, the distance judging unit 522, and the alarm unit 532 shown in FIG. 5.

The coordinate determining unit 542 is used for determining 3D spatial relative coordinates of the crane and the object to be lifted with a slewing center of the crane as an origin of a 3D spatial relative coordinate system.

The state obtaining unit 522 is used for obtaining working state information of the crane before the object to be lifted is lifted, wherein the working state information comprises a current slewing angle, a current telescopic length of a boom, a current luffing angle of the boom, and a current lifting height of a hook.

The control unit 562 is used for, according to the 3D spatial relative coordinates of the crane and the object to be lifted and the working state information, controlling the crane to perform a slewing action, a lifting and lowering action of the hook, and at least one of a telescopic action of the boom or a luffing action of the boom to lift the object to be lifted.

In this embodiment, the crane can be controlled, by the control device, to perform various actions to lift the object to be lifted according to the 3D spatial relative coordinates of the crane and the object to be lifted and the working state information. Furthermore, in the process of performing each action, an alarm may be performed in a case where the distance from the obstacle to a preset position of the crane is less than a preset distance corresponding to the preset position, thus the safety of the operation of the crane can be ensured.

Figure 8:
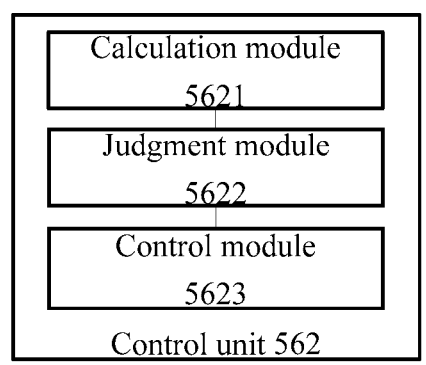
FIG. 8 is a schematic structural view showing an implementation of the control unit in FIG. 7.

FIG. 8 is a schematic structural view showing an implementation of the control unit in FIG. 7. As shown in FIG. 8, the control unit 562 comprises a calculation module 5621, a judgment module 5622, and a control module 5623. The calculation module 5621 is used for determining a target slewing angle according to the 3D spatial relative coordinates of the crane and the object to be lifted and the working state information. The judgment module 5622 is used for judging whether a projection of the hook on the horizontal plane is able to overlap with that of the object to be lifted by performing the luffing action of the boom alone to obtain a judgment result. The control module 5623 is used for controlling the crane to perform the slewing action to rotate to reach the target slewing angle; controlling, if the projection of the hook on the horizontal plane is able to overlap with that of the object to be lifted by performing the luffing action of the boom alone, the crane to perform the luffing action of the boom alone to make the projection of the hook on the horizontal plane overlap with that of the object to be lifted; controlling, if the projection of the hook on the horizontal plane is not able to overlap with that of the object to be lifted by performing the luffing action of the boom alone, the crane to perform the telescopic action of the boom alone, or perform both the luffing action of the boom and the telescopic action of the boom to make the projection of the hook on the horizontal plane overlap with that of the object to be lifted; and controlling the crane to perform the lifting and lowering action of the hook to lift object to be lifted.

In the above implementation, the slewing action, luffing action of the boom, telescopic action of the boom, and lifting and lowering action of the hook, may be prioritized from high to low in this order. In a case where the projection of the hook on the horizontal plane is able to overlap with that of the object to be lifted by performing a luffing action of the boom, a luffing action of the boom is performed alone to make the projection of the hook on the horizontal plane overlap with that of the object to be lifted to improve operating efficiency of the crane as the efficiency of the luffing action of the boom is higher than that of the telescopic action of the boom.

In one implementation, the control module 5632 is further used for determining a time $T_1$ required to perform the telescopic action of the boom alone to make the projection of the hook on the horizontal plane overlap with that of the object to be lifted, and a time $T_2$ required to perform both the luffing action of the boom and the telescopic action of the boom to make the projection of the hook on the horizontal plane overlap with that of the object to be lifted; comparing $T_1$ with $T_2$; controlling, if $T_1$ is less than $T_2$, the crane to perform the telescopic action of the boom alone to make the projection of the hook on the horizontal plane overlap with that of the object to be lifted; and controlling, if $T_1$ is greater than $T_2$, the crane to perform both the luffing action of the boom and the telescopic action of the boom to make the projection of the hook on the horizontal plane overlap with that of the object to be lifted.

In the above implementation, in a case where the projection of the hook on the horizontal plane is not able to overlap with that of the object to be lifted by performing the luffing action alone, a time required to perform the telescopic action of the boom alone to make the projection of the hook on the horizontal plane overlap with that of the object to be lifted, and a time required to perform both the luffing action of the boom and the telescopic action of the boom to make the projection of the hook on the horizontal plane overlap with that of the object to be lifted may be determined by the control module, and a method that takes a less time to make the projection of the hook on the horizontal plane overlap with that of the object to be lifted is selected. Thus the working efficiency of the crane can be further improved.

Considering a case where the obstacle is located between the crane and the object to be lifted, in one embodiment, the control device may further comprise an obstacle information determining unit for determining the length, the width and the height of the obstacle according to the 3D spatial coordinates of the obstacle. Here, the length, the width and the height of the obstacle can be used to assist the crane boom to operate across the obstacle. In this way, a collision between the crane and an obstacle can be avoided actively by the crane during the operation.

Furthermore, the control system of the above embodiments may further comprise a movable platform for carrying the 3D imaging device to rotate over the crane and dynamically scan the plurality of objects within the operating range of the crane. Illustratively, the movable platform may comprise an unmanned aerial vehicle or the like.

The present disclosure also provides a crane comprising the system for controlling operation of the crane provided by any one of the above embodiments. In one embodiment, the crane may comprise, but not limited to, a mobile crane such as a truck crane, an all terrain crane, a wheel crane, a crawler crane, or the like.

Each embodiment in this description is described in a progressive manner and focuses on differences from other embodiments. For the same or similar parts of various embodiments, reference can be made to each other. As system embodiments substantially correspond to the method embodiments, a relatively simple description is given, and reference can be made to the description of the method embodiments for relevant parts.

It should be understood by those of ordinary skill in the art that all or part of the steps for carrying out the method in the above embodiments can be completed by a program instructing related hardware, wherein the program can be stored in a computer readable storage medium. The program, when executed, implements the steps of the method embodiments. The above storage medium may comprise various media capable of storing program codes such as ROM, RAM, magnetic disk or optical disk.

The above description of the present disclosure is given for illustration and description, but is not exhaustive and is not intended to limit the present disclosure to the form disclosed herein. Various modifications and variations are apparent for a person of ordinary skill in the art. Embodiments are selected and described for a better illustration of the principle and practical application of the present disclosure, so that those skilled in the art can understand the present disclosure and envisage various embodiments with various modifications suited to specific usages.

What is claimed is:

1. A method for controlling operation of a crane, comprising:
    scanning dynamically, by a 3D imaging device, a plurality of objects within an operating range of the crane to obtain 3D spatial information of each of the plurality of objects, wherein the plurality of objects comprises the crane, an object to be lifted and an obstacle, and the 3D spatial information comprises 3D spatial coordinates;
    determining a distance from the obstacle to a preset position of the crane based on the 3D spatial coordinates of the crane and the obstacle;
    judging whether the distance from the obstacle to the preset position is less than a preset distance corresponding to the preset position;
    performing an alarm if the distance from the obstacle to the preset position is less than the preset distance corresponding to the preset position;
    determining 3D spatial relative coordinates of the crane and the object to be lifted with a slewing center of the crane as an origin of a 3D spatial relative coordinate system;
    obtaining working state information of the crane before the object to be lifted is lifted, wherein the working state information comprises a current slewing angle, a current telescopic length of a boom, a current luffing angle of the boom, and a current lifting height of a hook; and
    controlling, according to the 3D spatial relative coordinates of the crane and the object to be lifted, and the working state information, the crane to perform a slewing action, a lifting and lowering action of the hook, and at least one of a telescopic action of the boom or a luffing action of the boom to lift the object to be lifted.

2. The method according to claim 1, wherein the obstacle comprises a moving obstacle.

3. The method according to claim 1, wherein the preset position comprises at least one of a slewing center or a boom head.

4. The method according to claim 1, wherein determining the distance comprises:
    determining 3D spatial relative coordinates of the obstacle and the preset position with a slewing center of the crane as an origin of a 3D spatial relative coordinate system;
    determining the distance from the obstacle to the preset position according to the 3D spatial relative coordinates of the obstacle and the preset position.

5. The method according to claim 1, wherein the preset distance corresponding to the preset position comprises a warning distance and an early warning distance greater than the warning distance;
    performing the alarm comprises:
    performing an early warning if the distance from the obstacle to the preset position is between the warning distance and the early warning distance;
    performing a warning if the distance from the obstacle to the preset position is less than the warning distance.

6. The method according to claim 1, wherein the method further comprises:

determining a distance from the obstacle to the object to be lifted based on 3D spatial coordinates of the object to be lifted and the obstacle after the object to be lifted is lifted;

judging whether the distance from the obstacle to the object to be lifted is less than a preset distance corresponding to the object to be lifted; and performing an alarm if the distance from the obstacle to the object to be lifted is less than the preset distance corresponding to the object to be lifted.

7. The method according to claim 1, wherein controlling the crane comprises:

determining a target slewing angle according to the 3D spatial relative coordinates of the crane and the object to be lifted, and the working state information;

controlling the crane to perform the slewing action to reach the target slewing angle;

judging whether a projection of the hook on a horizontal plane is able to overlap with that of the object to be lifted by performing the luffing action of the boom alone to obtain a judgement result, controlling, if the judgement result is yes, the crane to perform the luffing action of the boom alone to make the projection of the hook overlap with that of the object to be lifted, controlling, if the judgement result is no, the crane to perform the telescopic action of the boom alone to make the projection of the hook on the horizontal plane overlap with that of the object to be lifted, or perform both the luffing action of the boom and the telescopic action of the boom to make the projection of the hook on the horizontal plane overlap with that of the object to be lifted; and controlling the crane to perform the lifting and lowering action of the hook to lift the object to be lifted.

8. The method according to claim 7, wherein controlling the crane to perform the telescopic action alone, or perform both the luffing action of the boom and the telescopic action of the boom comprises:

determining a time $T_1$ required to perform the telescopic action of the boom alone to make the projection of the hook on the horizontal plane overlap with that of the object to be lifted, and a time $T_2$ required to perform both the luffing action of the boom and the telescopic action of the boom to make the projection of the hook on the horizontal plane overlap with that of the object to be lifted;

comparing $T_1$ with $T_2$;

controlling, if $T_1$ is less than $T_2$, the crane to perform the telescopic action of the boom alone to make the projection of the hook on the horizontal plane overlap with that of the object to be lifted;

controlling, if $T_1$ is greater than $T_2$, the crane to perform both the lulling action of the boom and the telescopic action of the boom to make the projection of the hook on the horizontal plane overlap with that of the object to be lifted.

9. The method according to claim 1, wherein the obstacle is located between the crane and an object to be lifted, and the method further comprises:

determining a length, a width, and a height of the obstacle according to the 3D spatial coordinates of the obstacle, wherein the length, the width and the height of the obstacle are used to assist a boom of the crane to operate across the obstacle.

10. The method according to claim 1, wherein the 3D spatial information further comprises color information and inverse color rate information, and the method further comprises:

establishing a 3D spatial model of the obstacle based on the 3D spatial information of the obstacle; and sending an image information representing the 3D spatial model of the obstacle to an in-vehicle display to assist the crane to operate.

11. The method according to claim 1, wherein the 3D imaging device is carried by a movable platform to rotate over the crane and dynamically scan the plurality of objects within the operating range of the crane.

12. The method according to claim 11, wherein the movable platform comprises an unmanned aerial vehicle.

13. A system for controlling operation of a crane, comprising a 3D imaging device and a control device, wherein:

the 3D imaging device is used for scanning dynamically a plurality of objects within an operating range of the crane to obtain 3D spatial information of each of the plurality of objects, and sending the 3D spatial information of each of the plurality of objects to the control device, wherein the plurality of objects comprises the crane, an object to be lifted and an obstacle, and the 3D spatial information comprises 3D spatial coordinates;

the control device comprises:
a memory; and
a processor coupled to the memory, the processor is configured to, based on instructions stored in the memory, carry out:

determining a distance from the obstacle to a preset position of the crane based on the 3D spatial coordinates of the crane and the obstacle;

judging whether the distance from the obstacle to the preset position is less than a preset distance corresponding to the preset position;

performing an alarm if the distance from the obstacle to the preset position is less than the preset distance;

determining 3D spatial relative coordinates of the crane and the object to be lifted with a slewing center of the crane as an origin of a 3D spatial relative coordinate system;

obtaining working state information of the crane before the object to be lifted is lifted, wherein the working state information comprises a current slewing angle, a current telescopic length of a boom, a current luffing angle of the boom, and a current lifting height of a hook; and controlling, according to the 3D spatial relative coordinates of the crane and the object to be lifted, and the working state information, the crane to perform a slewing action, a lifting and lowering action of the hook, and at least one of a telescopic action of the boom or a luffing action of the boom to lift the object to be lifted.

14. The system according to claim 13, wherein controlling the crane comprises:

determining a target slewing angle according to the 3D spatial relative coordinates of the crane and the object to be lifted, and the working state information;

controlling the crane to perform the slewing action to reach the target slewing angle;

judging whether a projection of the hook on a horizontal plane is able to overlap with that of the object to be lifted by performing the luffing action of the boom alone to obtain a judgment result, controlling, if the judgment result is yes, the crane to perform the luffing action of the boom alone to make the projection of the hook overlap with that of the object to be lifted, controlling, if the judgment result is no, the crane to perform the telescopic action of the boom alone to make the projection of the hook on the horizontal plane overlap with that of the object to be lifted, or perform both the luffing action of the boom and the telescopic action of the boom to make the projection of the hook on the horizontal plane overlap with that of the object to be lifted; and controlling the crane to perform the lifting and lowering action of the hook to lift the object to be lifted.

15. The system according to claim 14, wherein controlling the crane to perform the telescopic action alone, or perform both the luffing action of the boom and the telescopic action of the boom comprises:

determining a time T1 required to perform the telescopic action of the boom alone to make the projection of the hook on the horizontal plane overlap with that of the object to be lifted, and a time T2 required to perform both the luffing action of the boom and the telescopic action of the boom to make the projection of the hook on the horizontal plane overlap with that of the object to be lifted;

comparing T1 with T2;

controlling, if T1 is less than T2, the crane to perform the telescopic action of the boom alone to make the projection of the hook on the horizontal plane overlap with that of the object to be lifted;

controlling, if T1 is greater than T2, the crane to perform both the luffing action of the boom and the telescopic action of the boom to make the projection of the hook on the horizontal plane overlap with that of the object to be lifted.

16. A crane, comprising: the system for controlling operation of a crane according to claim 13.

17. A method for controlling operation of a crane, comprising:

scanning dynamically, by a 3D imaging device, a plurality of objects within an operating range of the crane to obtain 3D spatial information of each of the plurality of objects, wherein the plurality of objects comprises the crane, an object to be lifted and an obstacle which is located between the crane and the object to be lifted, and the 3D spatial information comprises 3D spatial coordinates;

determining a distance from the obstacle to a preset position of the crane based on the 3D spatial coordinates of the crane and the obstacle;

judging whether the distance from the obstacle to the preset position is less than a preset distance corresponding to the preset position;

performing an alarm if the distance from the obstacle to the preset position is less than the preset distance corresponding to the preset position;

determining a length, a width, and a height of the obstacle according to the 3D spatial coordinates of the obstacle; and presenting on an in-vehicle device and indicia based on the length, the width and the height of the obstacle to assist operating a boom of the crane across the obstacle.

18. The system according to claim 13, wherein the obstacle is located between the crane and the object to be lifted, and the processor is further configured to determine a length, a width, and a height of the obstacle according to the 3D spatial coordinates of the obstacle, wherein the length, the width and the height of the obstacle are used to assist a boom of the crane to operate across the obstacle.

19. A crane, comprising: the system for controlling operation of a crane according to claim 14.

20. A crane, comprising: the system for controlling operation of a crane according to claim 18.

* * * * *